Patented Dec. 22, 1931

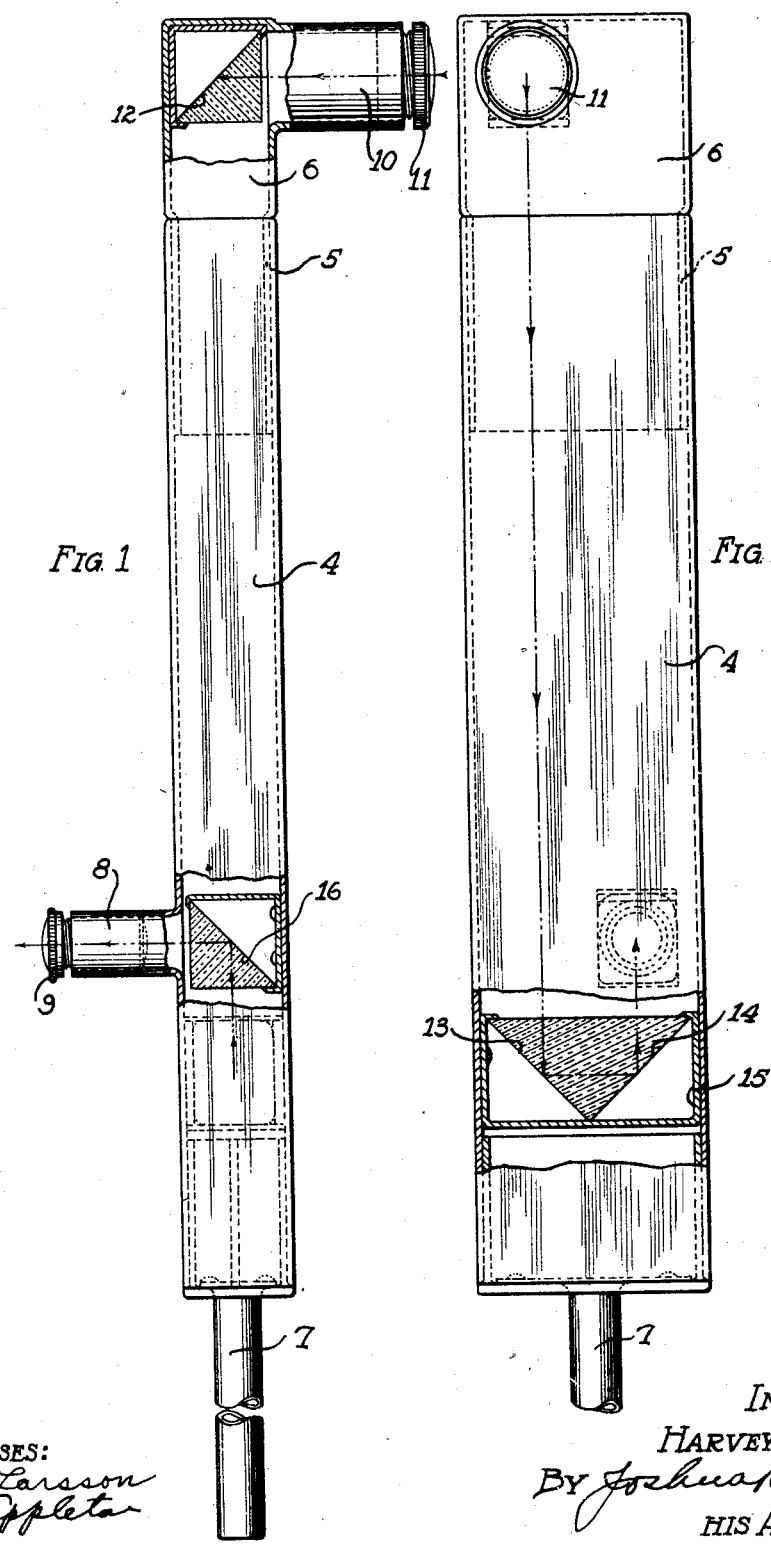

1,837,208

UNITED STATES PATENT OFFICE

HARVEY S. COVER, OF SOUTH BEND, INDIANA

MONOCULAR OPTICAL INSTRUMENT

Original application filed August 22, 1928, Serial No. 301,219. Divided and this application filed June 14, 1929. Serial No. 371,025.

This invention relates to a monocular optical instrument and pertains more particularly to an optical instrument of this type employing a system of reflecting prisms whereby a telescopic effect is produced in a device of compact size and convenient form.

An object of the invention is the provision of an instrument of this type having ocular and objective tubes provided with magnifying lenses and an intermediate telescopic tube containing a plurality of reflecting prisms whereby light is reflected from the plane of the objective lens to a remote point, and thence back to the plane of the ocular lens by means of a total reflecting prism.

A further object is the provision of a device of this character in which the ocular lens is positioned at a point remote from the objective lens whereby the instrument may be employed to function periscopically as well as telescopically.

An additional object is the adaptation of the instrument to a walking stick or the like whereby the device is inconspicuous and not likely to arouse alarm or suspicion on the part of animals or human beings desired to be observed.

Other objects will appear hereinafter.

The present application constitutes a divisional application of applicant's copending application, Serial No. 301,219, filed August 22, 1928, entitled "Monocular optical instruments".

The invention consists in the combinations and arrangements of parts hereinafter described and claimed.

The invention will be best understood by reference to the accompanying drawings forming a part of this specification and in which:

Fig. 1 is an elevational view, with certain parts broken away to more clearly illustrate the disposition of the reflecting prisms; and Fig. 2 is an elevational view, taken at right angles to Fig. 1 on the objective lens side of the instrument, with certain portions broken away.

As illustrated in the drawings, the preferred embodiment comprises a main rectangular tubular portion 4 which is preferably adapted and arranged to slidably and frictionally engage the downwardly extending rectangular portion 5 of a similar tubular portion 6. The instrument is preferably mounted upon the end of a rod 7 whereby the device may be used as a walking stick or the like.

Upon one side of the rectangular body 4 is mounted an ocular tube 8 within which may be screw threaded ocular lens 9 of any desired magnifying power. Upon the opposite side of member 4, but preferably not in either transverse or longitudinal alignment with tube 8, is mounted objective tube 10 within which is screw threaded an objective lens 11 of any desired magnifying power. Disposed within member 6 in alignment with objective tube 10 is a single reflecting prism 12 adapted to reflect the rays of light passing through tube 10 at right angles in a downward direction. Disposed adjacent the opposite end of member 4 is a total reflecting prism 13, 14, mounted in a suitable bracket 15, as shown in Fig. 2, and adapted to receive and reflect the rays of light from prism 12 in the direction shown in Fig. 2 upwardly to a second single reflecting prism 16 positioned in alignment with ocular tube 8 and lens 9.

For the reason that the prismatic system employed presents the image after reflection by prism 16 in an inverted position, for terrestrial observation the lens 12 may be of the negative Huygens type to reverse the image to upright position. Also, the body portion of lens 9 may have sliding engagement within tube 8 for the purpose of increasing or decreasing the focal length, although in the preferred embodiment screw threaded engagement is employed. Further, the focal length may be increased to any desired extent by increasing the length of member 4, and in use the sliding engagement of extension 5 within the member 4 may be utilized to vary and adjust the focal length.

The rod extension 7 has been found of material advantage, inasmuch as the optical instrument portion may be used as a handle and the rod extension 7 as the remaining portion of a walking stick, thus rendering the entire device convenient to transport, and rod 7 may also serve as a support for the instrument when in use. The construction and arrangement is such that the instrument combines periscopic as well as telescopic functions, and in the embodiment illustrated, the instrument may be held sidewise in such manner that the central rectangular tube 4 will act as a shield for the unused eye. Also, as is apparent, the instrument may be held with one hand or both hands in any desired vertical or horizontal position or at any angle, thus materially adding to its adaptability and range of usefulness.

While I have described and illustrated the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:

1. A portable monocular optical instrument, comprising a main tubular member, an objective tube extending laterally from said main tubular member adjacent the upper extremity thereof, an objective lens mounted in said objective tube, an ocular tube extending laterally from said main tubular member upon the opposite side from said objective tube, said ocular tube positioned at a point on said main tubular member adjacent the lower extremity thereof and remote from said objective tube to provide for periscopic vision, an ocular lens mounted in said ocular tube, an objective reflecting prism, an ocular reflecting prism, a total reflecting prism adapted to receive and reflect rays of light between said objective and ocular prisms, said objective tube being of sufficient length to provide a gripping handle portion, and means for securing said main tubular member to a supporting rod.

2. A portable monocular optical instrument, comprising an upper main tubular member, an objective tube extending laterally from said upper main tubular member adjacent the upper extremity thereof, an objective lens mounted in said objective tube, a lower main tubular member slidably engageable with said upper main tubular member whereby said members may be relatively shifted for focusing purposes, an ocular tube extending laterally from said lower main tubular member upon the opposite side from said objective tube, said ocular tube positioned at a point adjacent the lower extremity of said lower main tubular member and remote from said objective tube to provide for periscopic vision, an ocular lens mounted in said ocular tube, an objective reflecting prism, an ocular reflecting prism, a total reflecting prism adapted to receive and reflect rays of light between said objective and ocular prisms, said objective tube being of sufficient length to provide a gripping handle portion, and means for securing said lower main tubular member to a supporting rod.

In testimony whereof I have signed my name to this specification.

HARVEY S. COVER.